United States Patent [19]

Levin

[11] 3,904,937

[45] Sept. 9, 1975

[54] CIRCUIT MODULE RACK AND CHASSIS ASSEMBLY

[75] Inventor: Herbert L. Levin, Wyckoff, N.J.

[73] Assignee: International Telephone and Telegraph Corporation, Nutley, N.J.

[22] Filed: Apr. 12, 1974

[21] Appl. No.: 460,410

[52] U.S. Cl. ..... 317/120; 317/101 DH; 317/101 CB

[51] Int. Cl. .............................................. H05k 5/00

[58] Field of Search .. 317/100, 120, 101 CB, 101 DH, 317/101 D, 101 R; 174/15 R, 16 R

[56] References Cited

UNITED STATES PATENTS

| | | | |
|---|---|---|---|
| 3,311,792 | 3/1967 | Scoville | 317/101 DH |
| 3,541,395 | 11/1970 | Lucchino | 317/100 |
| 3,708,725 | 1/1973 | Burton | 317/120 |
| 3,758,829 | 9/1973 | Kroll | 317/101 DH |
| 3,780,353 | 12/1973 | Gordon | 317/101 DH |

*Primary Examiner*—Gerald P. Tolin
*Attorney, Agent, or Firm*—John T. O'Halloran; Menotti J. Lombardi, Jr.; R. A. Menelly

[57] ABSTRACT

A combination electric circuit module and chassis assembly for use in mobile communication carriers and methods for forming both the assembly and the module wherein the chassis has a front casing and a back casing interconnected by means of a support enclosure, and wherein a plurality of radio modules are removably mounted upon shelves within the chassis. Each of said modules comprises a continuous extruded and shaped frame. The cross-section of the frame integrally includes a series of continuous grooves for containing a pair of covers, two separate radio interference gaskets, an electric circuit board and a guiding groove for inserting each module within the chassis. The combination electric circuit module and chassis provides good radio frequency insulation shielding properties for the enclosed circuitry and convenient access to each circuit board for removal and repair thereof.

3 Claims, 15 Drawing Figures

PATENTED SEP 9 1975

3,904,937

PATENTED SEP 9 1975

3,904,937

SHEET 4 OF 5

CIRCUIT MODULE RACK AND CHASSIS ASSEMBLY

BACKGROUND OF THE INVENTION

Mobile communication carriers provide convenient on-site communication facilities for remote commercial and military application. Since the instrumentation and communication apparatus contained within these units is of sensitive and delicate design, the chassis containing the communications equipment must have a rugged and durable structure in order to protect the enclosed apparatus from damage during use. Sufficient strength and support must also be imparted to the module and chassis structure to insure that the delicate communications apparatus is not injured while the carrier unit is in transport.

One limitation upon the amount of supporting structure that can be employed within the mobile carrier is the relatively limited weight requirement. The amount of equipment that can be transported by the carrier must in part be compromised by the weight of the chassis and housing requirements necessary to furnish sufficient structural support and radio frequency shielding to the equipment.

The type of mobile shelter generally employed consists mainly of a wheeled trailer that has auxiliary towing equipment for transportation purposes. Radio receiving and transmitting apparatus is conveniently located within the trailer upon a row of racks on either side of the trailer bolted to the trailer frame. Electric circuit modules containing both receiving and transmitting equipment are mounted in a chassis, and the chassis is secured within the support racks of the trailer.

In order to meet the structural requirements of the mobile communications assembly, currently employed chassis are generally made from welded or bolted box-like containers. Since the metal support structures usually consist of individual heavy metal metal sections which require welding, brazing and bolting, a large inventory of various metal lengths and configurations along with a supply of the necessary installation tools must be kept on hand. The construction requirements and the assembly equipment and materials necessary to meet these requirements therefore contribute to make the cost of chassis manufacture very expensive.

Most of the printed circuit radio modules that are used within these chassis are fabricated from sheet metal or aluminum boxes which require several drilling, forming and assembly operations. In most instances, these modules must pass rigid military and commercial standards for both weather resistance and radio frequency shielding. Sheet metal covers are quite often required for both the top and bottoms of these modules, and radio frequency interference gaskets are most frequently required. Since the module components consist of several individual parts that have to be brazed, riveted or screwed together, adequate care must be taken in order to provide for radio frequency interference shielding.

One particular problem that exists with current-day modules is the requirement of several closely-spaced screws on both the cover and bottom plates of the modules. This close spacing requirement involving a large number of screws is necessary to insure that the covers do not buckle or otherwise expose the internal components of the module to extraneous radio frequency interference. This large number of screws seriously impairs access to the contents of the module when repair is necessitated in the field, as quite often occurs. The individual screws must be removed to provide access, and particular care must be taken to insure that none of these screws fall into the delicate electronic printed circuit boards contained therein. The large number of component parts required for present-day module installation and the tools required for their assembly further adds to the weight load upon the total mobile communications system when installation and repair are required on site.

The combined ratio module and chassis assembly of the instant invention overcomes a great number of the disadvantages of the chassis and modules of the prior art. Functional design obviates the requirement of a large number of component parts, reducing the expense of assembly and greatly and greatly reducing inventory requirements. Access to the printed circuit boards contained within these modules is conveniently and rapidly attained by simply removing the module and pulling or sliding the covers from the module.

Use of multifunctional metal castings for the main components of the chassis results in rugged, light-weight structural design without bolting or welding. This improved lightness and strength imparted to the radio module and chassis of the instant invention provides for more structure and support to the racks within the mobile unit where such support is more seriously required. The savings in weight therefore allows added structure to be imparted to the rack mounting within the carrier without adding to the overall total chassis and rack weight requirements. The overall chassis/rack design therefore may be optimized by making each element the supporting member of the other therefore deleting redundant structural members thereby resulting in a substantial decrease in cost and weight.

SUMMARY OF THE INVENTION

This invention comprises an electric circuit module and chassis assembly, and methods for making the module and the assembly. The chassis has a front and a back casing and means to hold the front and back casings together. The module is formed from an extruded and shaped frame having a cross-section which integrally includes a series of predeterminately positioned continuous grooves for retaining a cover and cover gasket, a base plate gasket, an electric circuit board, and a guide for ease in inserting the module within the chassis. The combination radio module and chassis assembly provides for convenient removal from the rack mounting in the mobile communication system along with rapid access to the electric circuit components within the module.

DESCRIPTION OF THE PREFERRED EMBODIMENTS

The module of the instant invention is constructed from a length of metal formed by an extrusion process which integrally imparts the means for retaining all the module components into the cross-section of the metal. This multifunctional property is accomplished by extruding a lightweight metal alloy having good structural and tensile properties through a specially designed extrusion die. In one particular embodiment, the extruding die was designed to include six carefully spaced continuous grooves extending throughout the entire length of the metal used. The metal was then cut to a series of sections of roughly 28 inches per section.

Figure 1A:
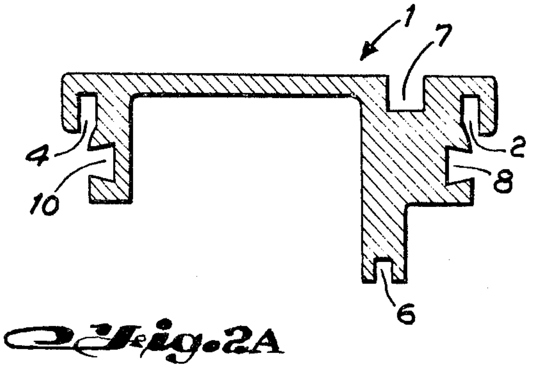
FIG. 1A shows an end view of the cross-section of a module frame according to one embodiment of the invention.
Figure 1B:
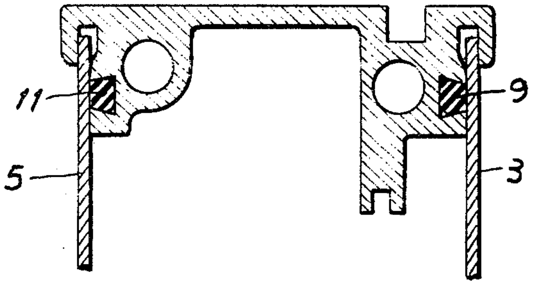
FIG. 1B shows a similar end view with cover, gaskets, and base plates mounted thereon.

FIGS. 1A and 1B show the cross-section of the module frame 1 used in the aforementioned embodiment of this invention wherein a first groove 2 for housing a first module cover 3, a second groove 4 for retaining the second module cover 5, a third groove 6 for retaining the printed circuit board (not shown), a fourth groove 7 providing guide means for the insertion of the module 1, a fifth groove 8 for retaining a first radio frequency interference gasket 9, and a sixth groove 10 for retaining a second radio frequency interference gasket 11 are all integrally formed within the extruded cross-section resulting in the multifunctional structure of the claimed invention.

Figure 2A:
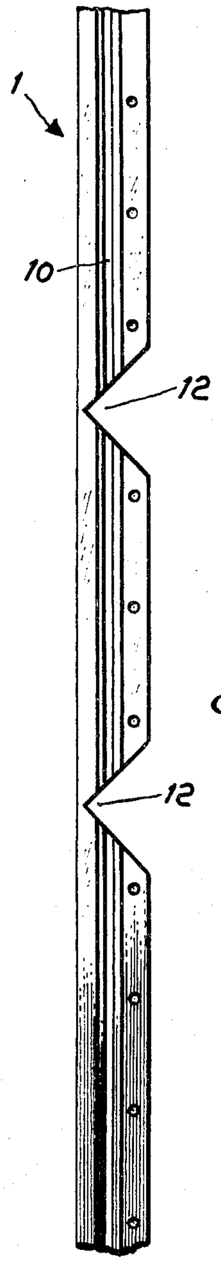
FIG. 2A shows a side view of the extruded frame with triangular cuts prior to shaping.
Figure 2B:
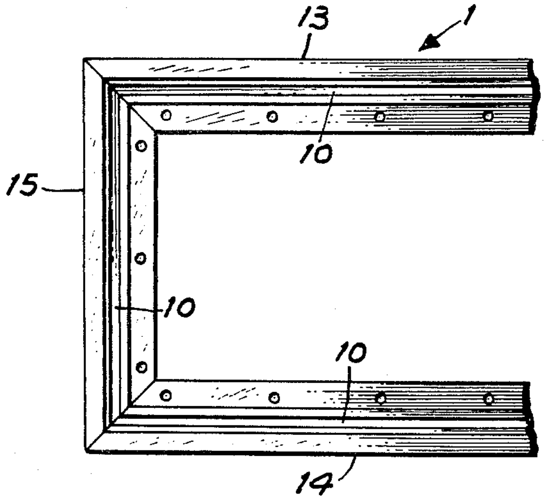
FIG. 2B shows a similar side view after shaping into the desired module structure.
Figure 2C:
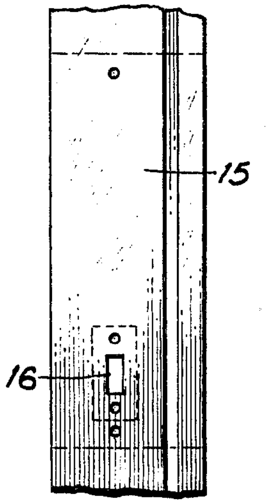
FIG. 2C shows an end view of the rear section of the formed module with an electrical connector access slot illustrated therethrough.

Referring to FIG. 2A, there is shown the 28 inch length 1 of an extruded aluminum magnesium alloy having the cross-section depicted in FIG. 1A. Two triangular cuts 12 approximately 5½ inches apart are cut out from the length by conventional metal punching techniques. FIG. 2B shows the length after pressure has been applied to each end of the length in order to achieve the desired U-shaped configuration having first and second sides 13 and 14 and an end section 15. An electrical access slot 16 is depicted in FIG. 2C extending through end section 15 in order to provide for electrical connection to a printed circuit board.

The multifunctional extruded metal shape described above readily lends to the inclusion of one or more separate partitions which can be conveniently inserted between the sides of the module in order to allow several circuits to be included within a single module enclosure.

Figure 3A:
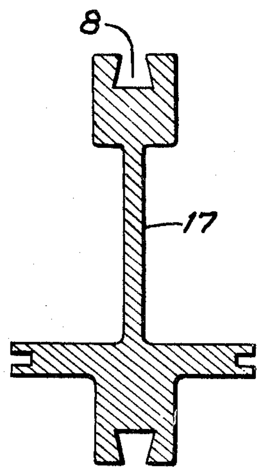
FIG. 3A shows in end view the cross-section of an extruded partition for use with an alternate embodiment of the module frame of this invention.
Figure 3B:
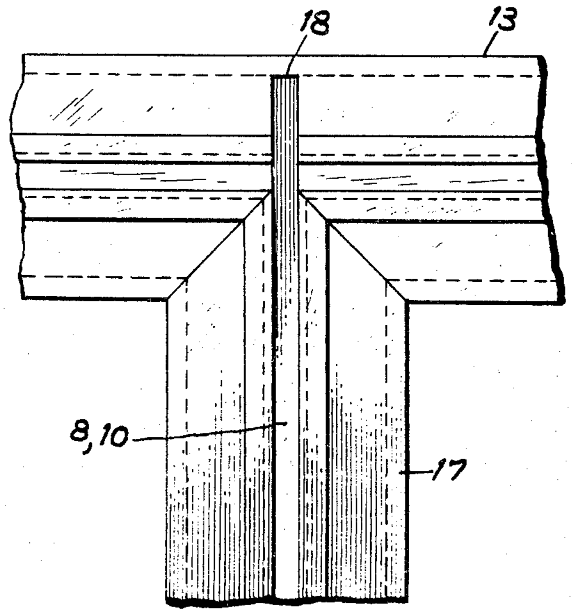
FIG. 3B shows a side view of the module frame with the extruded partition attached thereto.

Referring to FIG. 3A, there is shown an end view of an extruded metal crosssection having the multifunctional grooves which in an alternate embodiment can be used as a partition 17 extending across the side members 13 and 14 of FIG. 2B. FIG. 3B in greater detail shows one such side member, for example, 13 having a pre-cut complementary-shaped slot 18 into which the partition 17 can be inserted. The partition 17 is formed so that the r.f. gasket grooves 8, 10 are continuous on both sides and the inner walls of the partition.

Figures 4, 4A, 4B, 5A, 5B:
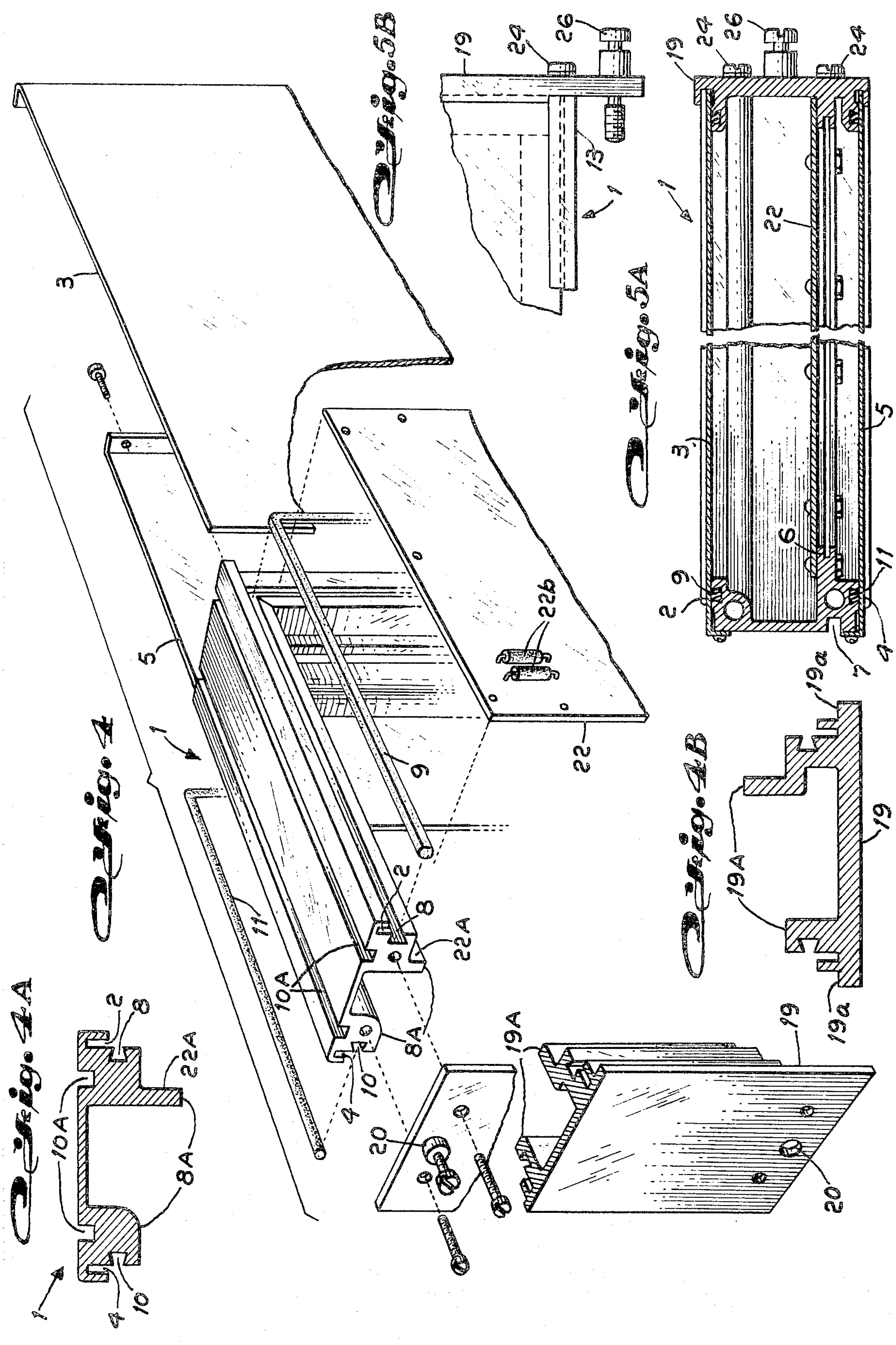
FIG. 4 is an orthographic projection of the module showing the location of each of the individual components prior to assembly.
FIG. 4A shows a cross-section of one embodiment of the extruded element.
FIG. 4B shows a cross-section of another embodiment of the extruded element.
FIG. 5A is a top sectional view of the module with the individual components inserted therein.
FIG. 5B is a fragmentary side view showing the method of attachment between the front plate and the module and the means for securing the module to its chassis.

The method of assembling a typical module 1 can be seen by referring now to FIG. 4 where a face plate 19 containing a pair of mounting holes 20 is used in attaching the face plate to the module chassis. The face plate 19 is shown prior to and in position for attachment to the module 1. First the cover 3 and the first radio frequency interference gasket 9 is shown in line with their retaining grooves 2 and 4, respectively, and are each respectively inserted into their corresponding grooves. The U-shaped configuration of the module frame 1 forms a continuous enclosure for the retaining grooves except for the front face of the module which is then closed by means of the face plate 19. A printed circuit board 22 containing electrical components 22B is now inserted onto a surface formed onto the extruded cross-section 22A and electrical connections are established thereto. The foregoing is an example of a typical circuit module for use in a radio chassis assembly. This is by way of example only and is not intended to limit the scope of the possible circuit module applications in other types of transmission or reception chassis assemblies.

In the next order of assembly sequence there is inserted a second radio interference gasket 11 within its corresponding retaining groove 7 and a second cover 5 is next inserted within its corresponding retaining groove 8. FIGS. 4A and 4B show end views of other cross-sections which can be imparted to the extruded member to impart other features. The extended lip configuration 19A of FIG. 4B is used on the front panel to direct air flow through the chassis. Another feature of the invention includes the extruded front panel 19 where the extended ridge 19A complementary mates with the corresponding extended ridge sections 8A of the extruded side members so that the grooves contained on the end sections of the side members meet in a continuously extending groove-like relation with the grooves contained within the front panel. Module guide grooves 10A are integrally formed during the extrusion process, these grooves 10A slide on complementary runners on the chassis (not shown).

The novel multifunctional properties imparted to the module by means of the continuous grooves throughout its cross-section can be seen in detail by now referring to FIGS. 5A and 5B. FIG. 5A shows a top sectional view of the module 1 with all the components mounted thereon.

FIG. 5B illustrates in a side sectional view the method of attachment between the face plate 19 and the module 1 by means of screw 24. Also shown is a larger quick release-type screw 26 extending through face plate 19 for securing the module to the chassis when the module is assembled thereon.

Although the descriptive embodiment is shown to consist of a rectangular module frame in which the side sections are depicted to be longer than the back section, several other geometric configurations can be achieved by varying the respective lengths of the sides relative to the end portion.

Figure 5C:
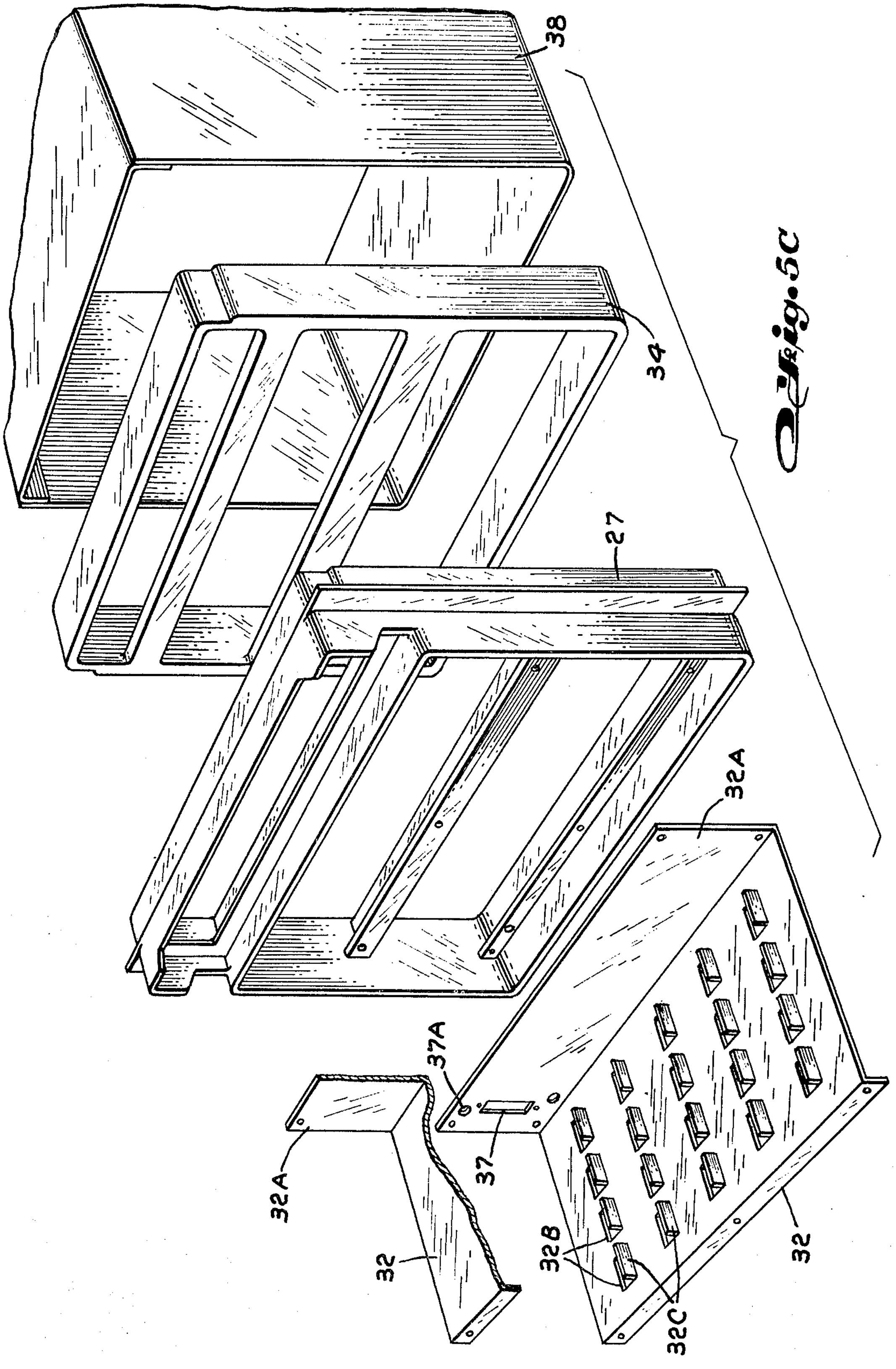
FIG. 5C shows the chassis components in pre-assembly configuration.

FIG. 5C shows the radio module chassis prior to assembly where the rear casing 34 of cast aluminum alloy is assembled by sliding into the connecting member 38 of sheet metal, and the front casing 27 of cast aluminum alloy is also slid into the connecting member 38. The connecting shelves 32 with an upright rear member 32A which includes slotted openings 37 and module guide pin holes 37A, is then inserted into the connecting member 38 between the front and back casings 27, 34 and is attached thereto. The air circulation throughout the assembled module-chassis combination is provided by means of a series of air holes 32B which are multifunctional in that the holes 32B are punched in a manner such that the portion of the shelf tab 32C that remains is predeterminately positioned to act as module guides when the modules 1 are inserted thereon.

Figure 6A:
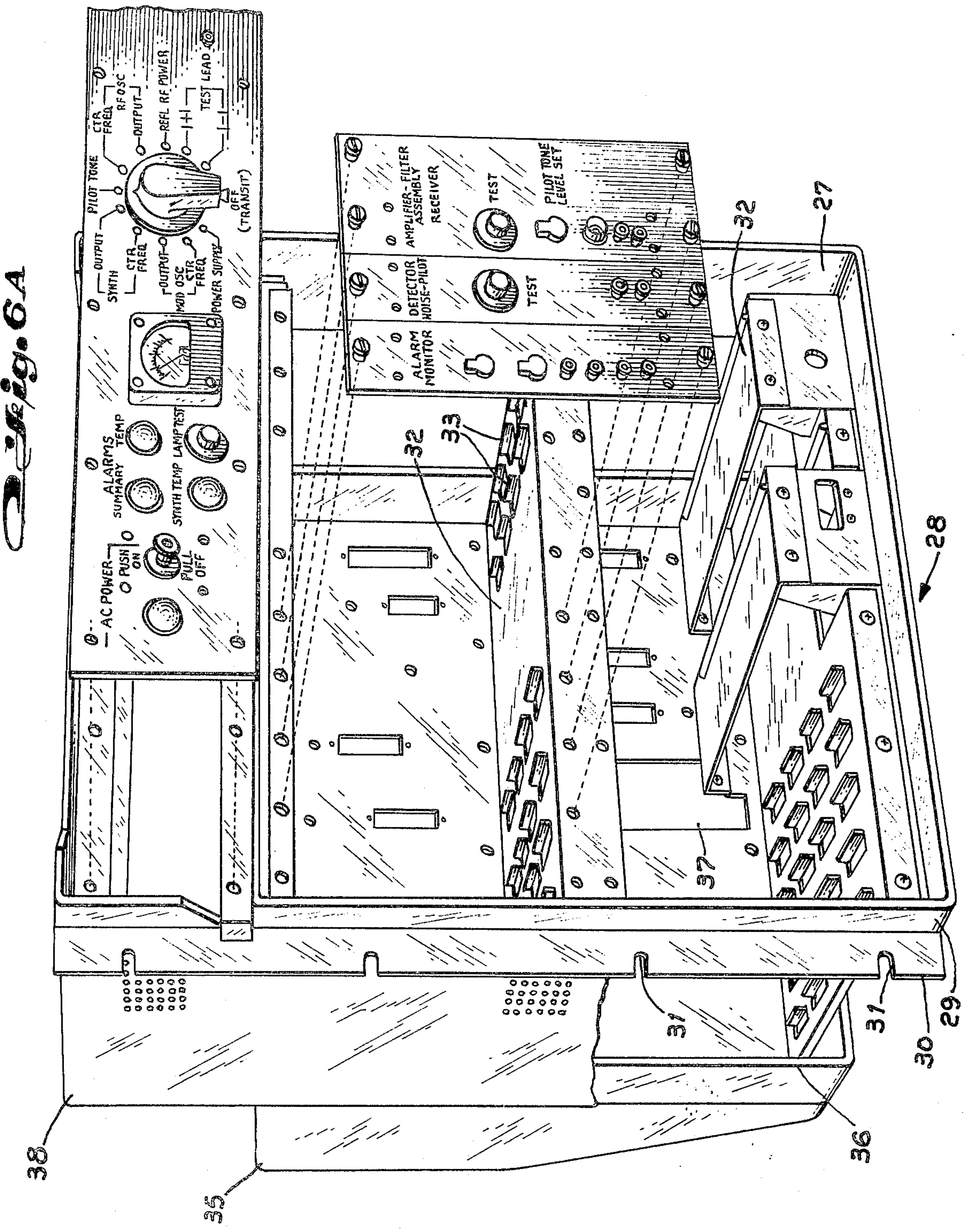
FIG. 6A is a front perspective view showing the module chassis combination with the modules orthographically projected therefrom.

FIG. 6A shows various designs of the modules 1 having different geometric height to width ratios. Also shown in FIG. 6A is one embodiment of a partially complete radio module chassis assembly.

Figure 6B:
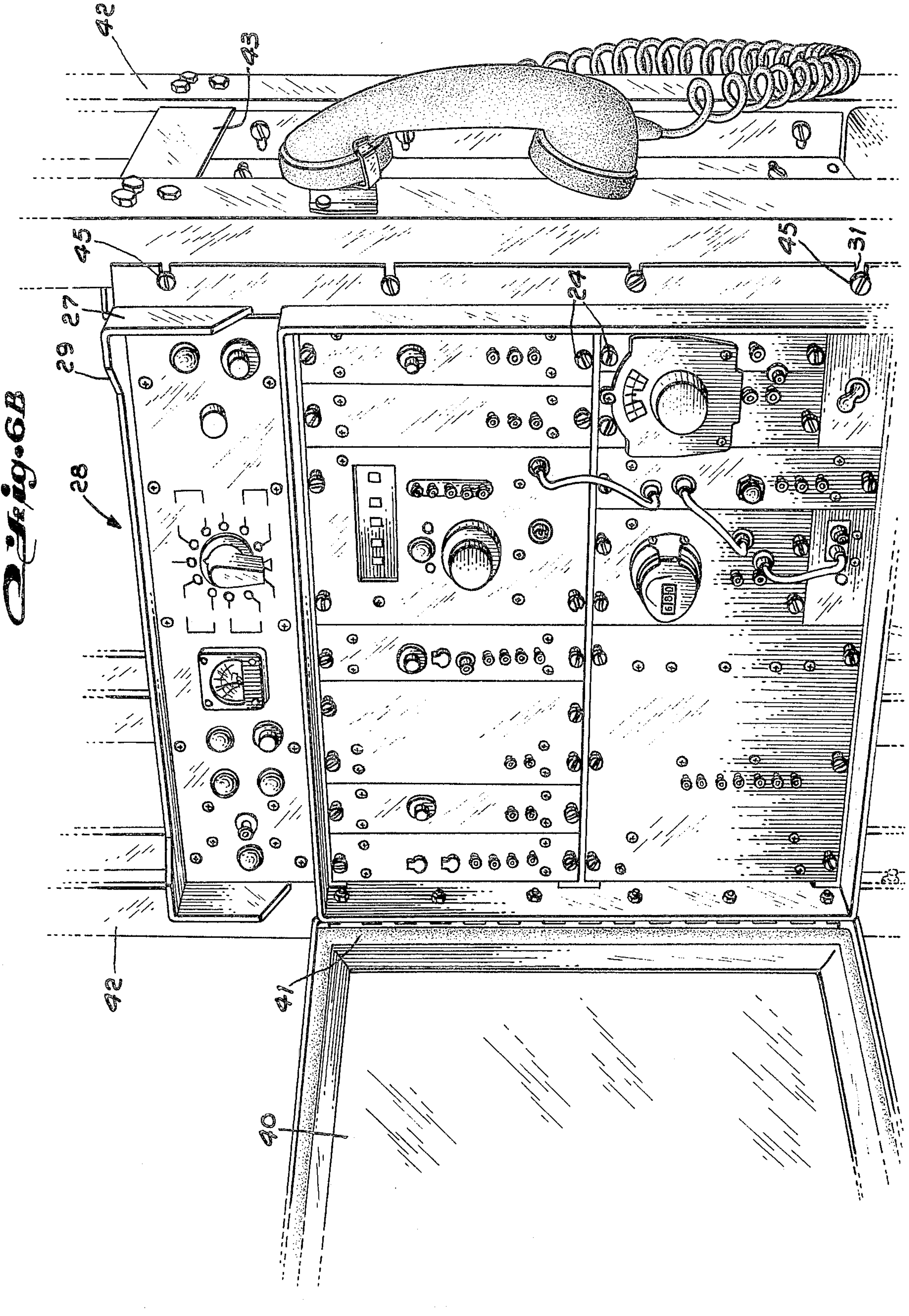
FIG. 6B shows one embodiment of a complete module chassis assembly mounted upon the carrier racks.

The front casing 27 of the assembly 28 can be seen in detail with the forward extending lip 29, the side projections 30, along with the series of slots 31 providing means for mounting the assembly to the carrier racks (shown in FIG. 6B). The connecting shelves 32 along with the rail-like protrusions 33 are also shown. The back casing 34 and the integrally included cooling fan mount 35 can be seen separated from the front casing 27 by an alternate partition 36; the alternate partition 36 may also include slotted openings 37 in order to provide controlled air flow throughout the module chassis assembly and to provide selective access to the electric circuit modules contained within the assembly. The connecting member 38 is shown partially assembled to illustrate the interconnection between front and back casings 27 and 34 respectively and provides support for the electrical connectors and add further support to the module. The chassis connecting member 38 also serves as a shear plate to withstand shear loads.

FIG. 6B shows a completely assembled electric circuit module chassis assembly 28 attached to the trailer support racks 42. Structural cross-members 43 are shown in further support of the racks 42. The use of supplemental cross-members which also act as chassis guides is made possible by the lower weight assembly mounted thereon. The method of securing the assembly 28 to the racks 42 is shown to consist of large mounting screws 45 extending through the slots 31 provided on the forward extending lip 29 of the front casing 27. Further depicted is the assembly door 40 including the R.F.I. door gasket 41 mounted on the interior portion of the door.

The advantages of the multifunctional structure included within this embodiment can readily be seen by reference to the completely assembled unit of FIG. 6B described herein. In the event of operational failure in the field of any of the component modules within the assembly, access can be readily achieved by merely loosening the face plate module screws 24 and pulling or otherwise slidingly removing the defective module from the chassis. The covers can now be removed from the module by loosening the two retaining screws. Sliding the top cover rearward from its retaining groove now allows complete access to the printed circuit contained within the module. As it is now designed, for example, the printed circuit board can either be repaired or replaced upon assessment as to the extent of damage incurred. However, in emergency situations, the entire module can be readily replaced by another from a stock pile or replacement modules.

One metal suitable for use in the preferred embodiments is aluminum magnesium alloy type 6063 chosen for its high-tensile strength per unit weight. The front panel extrusion, for example, is made of a type 6061T6 aluminum alloy which is chosen for its minimum flexibility and maximum strength, and is heat treated into a particular degree of hardness. The side extruded members, for example, are made of an aluminum alloy type 6063T52, chosen for its bending properties and is heat treated to a particular degree in order to allow the extruded members to be bent without becoming fractured in the bending process. Other extrudable metals familiar to the practitioners in the field of metal processing could similarly be employed. The material used for the radio frequency interference gasket consisted of a metal powder impregnated elastomer which combines the properties of good electrical conductivity and effective moisture retardability. Other gaskets such as braided silver, braided copper, and braided aluminum mesh-type gaskets and alloys of these metals could also be employed where the moisture retarding properties of the elastomer are not required. The size of the gasket of the metal braid mesh configuration should be chosen such that the press-fit which results between the cover and the cover gasket groove and the base plate and the base plate gasket groove is such that the gasket becomes slightly crushed in the process. This not only insures a continuous enclosure between the interface of the cover and the corresponding gasket groove, for example, but also assures good electrical conduction between the cover and the groove of the module through the gasket.

While the principles of this invention have been described above in connection with specific apparatus, it is to be understood that this description is made only by way of example and not as a limitation on the scope of the invention as set forth in the objects and features thereof and in the accompanying claims.

I claim:

1. An electric circuit module and chassis assembly for rack mounting in mobile communication carriers comprising in combination:

a chassis having front and back casings, the front casing comprises top, bottom and side members integrally structured to form a hollow frame including a plurality of horizontal cross-members integrally formed within and extending between said side members for providing support to at least one circuit module when mounted thereon, a front rectangular lip extending outward along the entire frame, a pair of side projections, one projection extending vertically along each of said side members, said pair of projections providing means for connecting the assembly within the mobile carriers, and a rear rectangular lip extending along the entire frame to provide a surface for connecting an enclosure thereto, the back casing comprises top, bottom and side members integrally structured to form a hollow frame and complementarily arranged relative to said front casing;

a continuous rectangular enclosure member comprising top, bottom and side sections enclosing said front and back casings to provide a supporting enclosure for said front and back casings;

a plurality of shelves mounted within said enclosure member and interconnecting said front and back casings, each of said shelves containing at least one upwardly extending rail member for slidingly engaging at least one corresponding groove in at least one circuit module thereon; and a plurality of circuit modules removably mounted upon said shelves, each of said modules comprising an integrally constructed U-shaped member wherein the sides of said U-shaped member constitute the sides of each module, and the base of said U-shaped member constitutes the back section, each of said modules containing at least one electric circuit board removably attached therein, each of said modules having a groove which slidably engages with each of said rail members

2. The assembly of claim 1 further including at least one door hingeably mounted relative to the front casing and radio frequency interference gasket means mounted on the door in order to produce a radio interference shield when said door is closed against said casing.

3. The assembly of claim 1 wherein the rear casing is made from a single metal casting which includes a cooling fan mount integrally formed within said casing in order to provide support means for a cooling fan, a transformer mount to provide support for a transformer, and a manifold integrally formed within said casting to direct the air flow therefrom by means of said manifold.

* * * * *